US012586084B2

(12) United States Patent
  Peters

(10) Patent No.: US 12,586,084 B2
(45) Date of Patent: Mar. 24, 2026

(54) DATA ANALYTICS TOOL

(71) Applicant: The Trust Captain, LLC, Scottsdale, AZ (US)

(72) Inventor: Bryan Peters, Scottsdale, AZ (US)

(73) Assignee: THE TRUST CAPTAIN, LLC, Scottsdale, AZ (US)

( * ) Notice: Subject to any disclaimer, the term of this patent is extended or adjusted under 35 U.S.C. 154(b) by 0 days.

(21) Appl. No.: 17/019,058

(22) Filed: Sep. 11, 2020

(65) Prior Publication Data

US 2021/0081962 A1      Mar. 18, 2021

Related U.S. Application Data

(60) Provisional application No. 62/900,317, filed on Sep. 13, 2019.

(51) Int. Cl.
  *G06Q 30/018*      (2023.01)
  *G06F 16/9535*     (2019.01)
  *G06Q 40/12*       (2023.01)
  *G06Q 50/26*       (2024.01)
  *H04L 9/40*        (2022.01)

(52) U.S. Cl.
  CPC ..... *G06Q 30/0185* (2013.01); *G06F 16/9535* (2019.01); *G06Q 40/12* (2013.12); *G06Q 50/265* (2013.01); *H04L 63/1425* (2013.01)

(58) Field of Classification Search
  CPC .......................... G06Q 30/0185; G06Q 50/265
  See application file for complete search history.

(56) References Cited

U.S. PATENT DOCUMENTS

| | | | | |
|---|---|---|---|---|
| 6,601,048 B1 * | 7/2003 | Gavan | .................. | H04M 15/47 |
| | | | | 706/62 |
| 7,686,214 B1 * | 3/2010 | Shao | ...................... | G06Q 40/03 |
| | | | | 235/382 |
| 7,991,689 B1 * | 8/2011 | Brunzell | ................ | G06Q 40/03 |
| | | | | 705/38 |

(Continued)

FOREIGN PATENT DOCUMENTS

WO          2017007705 A1      1/2017

OTHER PUBLICATIONS

Rasumov, Nikon, "Stop the Bots: Practical Lessons in Machine Learning", Feb. 2019, https://blog.cloudflare.com/stop-the-bots-practical-lessons-in-machine-learning (Year: 2019).*

(Continued)

*Primary Examiner* — Allen C Chein
(74) *Attorney, Agent, or Firm* — SNELL & WILMER L.L.P.

(57) ABSTRACT

A device and method for Internet security is disclosed. The device includes a processor configured to receive a query from a website. The query includes data associated with a user establishing an account with the website. The processor is further configured to process the query to determine when to return an indication to the website. The indication indicates a suspected attempt to establish a fraudulent account. The processing includes comparing the data from the user to reference data indicating an attempt to fraudulently establish the website account. Additionally, the processor is further configured to return the indication to the website based on the processing of the query.

26 Claims, 3 Drawing Sheets

300

(56) References Cited

U.S. PATENT DOCUMENTS

| | | | |
|---|---|---|---|
| 8,478,232 B2 | 7/2013 | Vasten | |
| 8,826,450 B2 * | 9/2014 | Hariharan | H04L 51/212 |
| | | | 709/206 |
| 8,892,661 B2 * | 11/2014 | Ramarao | G06N 20/00 |
| | | | 709/206 |
| 8,918,901 B2 | 12/2014 | Mandava | |
| 9,152,952 B2 | 10/2015 | Smith | |
| 9,838,384 B1 | 12/2017 | Kane-Parry et al. | |
| 9,917,826 B2 | 3/2018 | Wyn-Harris | |
| 10,127,554 B2 * | 11/2018 | Russell | G06Q 20/40 |
| 2004/0111305 A1 * | 6/2004 | Gavan | H04Q 3/0062 |
| | | | 706/47 |
| 2006/0149674 A1 * | 7/2006 | Cook | G06Q 40/02 |
| | | | 705/44 |
| 2012/0005749 A1 * | 1/2012 | Zoldi | G06Q 40/02 |
| | | | 726/22 |
| 2013/0136343 A1 * | 5/2013 | de Zeeuw | G06V 20/52 |
| | | | 382/162 |
| 2014/0195441 A1 | 7/2014 | Johnson | |
| 2016/0080381 A1 | 3/2016 | Hall | |
| 2017/0098219 A1 * | 4/2017 | Peram | G06Q 20/3224 |
| 2017/0316415 A1 | 11/2017 | Gonzalez et al. | |
| 2017/0374076 A1 * | 12/2017 | Pierson | H04L 63/1408 |
| 2019/0295089 A1 * | 9/2019 | Jia | G06N 20/00 |

OTHER PUBLICATIONS

Grigonis, "Back off, photo thieves: Flickr alerts photographers to image theft with Pixsy", Apr. 2019, https://www.digitaltrends.com/photography/flickr-pixsy-integration/ (Year: 2019).*

Norton, "Tell-tale signs your online date may be an online fraud", Aug. 2018, https://uk.norton.com/blog/online-scams/tell-tale-signs-your-online-date-may-be-an-online-fraud (Year: 2018).*

Kount Complete, Jan. 2019, https://web.archive.org/web/20190109102522/https://www.kount.com/fraud-detection-software/kount-complete) (Year: 2019).*

Xiao, "Detecting Clusters of Fake Accounts in Online Social Networks" 2015 (Year: 2015).*

International Search Report mailed Dec. 15, 2020 in corresponding International Application No. PCT/US20/50550.

Written Opinion mailed Dec. 15, 2020 in corresponding International Application No. PCT/US20/50550.

* cited by examiner

200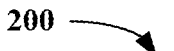

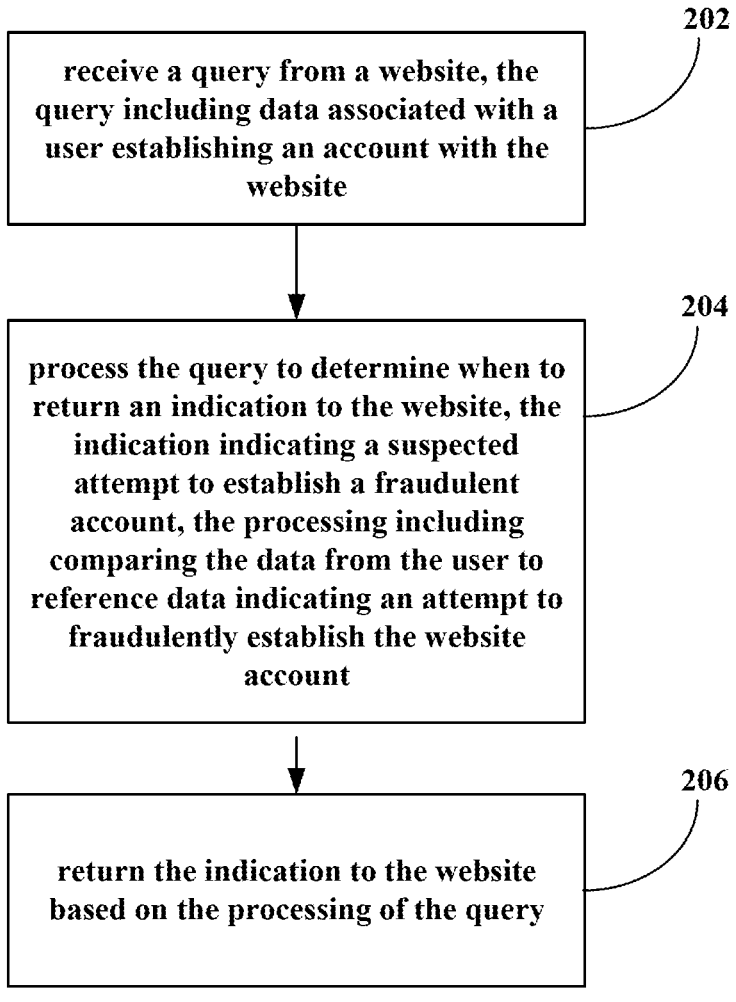

202 receive a query from a website, the query including data associated with a user establishing an account with the website

204 process the query to determine when to return an indication to the website, the indication indicating a suspected attempt to establish a fraudulent account, the processing including comparing the data from the user to reference data indicating an attempt to fraudulently establish the website account

206 return the indication to the website based on the processing of the query

FIG. 2

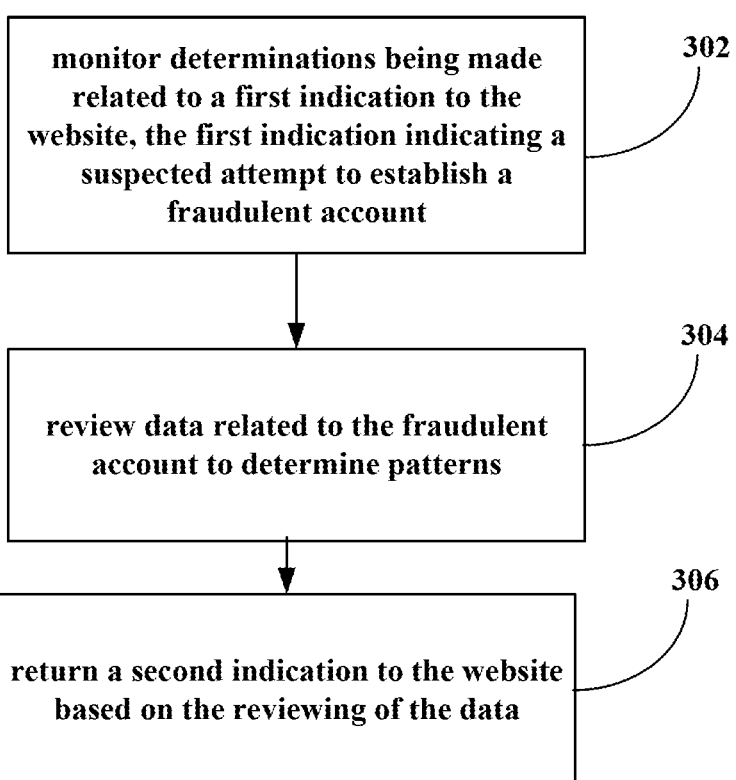
300
302
monitor determinations being made related to a first indication to the website, the first indication indicating a suspected attempt to establish a fraudulent account
304
review data related to the fraudulent account to determine patterns
306
return a second indication to the website based on the reviewing of the data
FIG. 3

DATA ANALYTICS TOOL

CROSS-REFERENCE TO RELATED APPLICATION

This application claims the benefit of U.S. Provisional Application No. 62/900,317, filed Sep. 13, 2019, and entitled DATA ANALYTICS TOOL, the contents each of which are hereby incorporated herein by reference, to the extent such contents do not conflict with the present disclosure.

FIELD OF INVENTION

The present disclosure generally relates to websites, and more specifically to website security.

BACKGROUND

Internet fraud is the use of Internet services or software with Internet access to defraud victims or to otherwise take advantage of them. According to the Federal Bureau of Investigation (FBI), Internet crime schemes steal millions of dollars each year from the victims of these Internet crimes.

To perpetuate these crimes, in some cases, people may set up fraudulent accounts on websites. The fraudulent accounts may be used to facilitate Internet fraud. For example, a person or group of people may set up an email address or addresses on a website to conduct fraudulent activity. The accounts may be used to contact potential victims. For example, email addresses may be used for phishing or spoofing. Spoofing generally refers to the dissemination of e-mail which is forged to appear as though it was sent by someone other than the actual source. Phishing is often used in conjunction with a spoofed e-mail. Phishing is the act of sending an e-mail falsely claiming to be an established legitimate business to deceive the unsuspecting recipient into divulging personal, sensitive information such as passwords, credit card numbers, and bank account information after directing the user to visit a specified website. The website, however, is not genuine and was set up only as an attempt to steal the user's information.

One way to fight Internet fraud is to eliminate the fake accounts before the fake accounts may be used to conduct these fraudulent activities or to at least eliminate the fake accounts as soon as possible to limit the fraudulent activity to a minimum. However, to eliminate the fake accounts, the fake accounts first need to be identified. Accordingly, an automated way to identify accounts suspected of being set up for fraudulent activities may be advantageous. After an account is identified it may be subject to further review, such as by a human reviewer.

SUMMARY

In an exemplary embodiment, a method of Internet security includes receiving a query from a website. The query includes data associated with a user establishing an account with the website. The exemplary embodiment further includes processing the query to determine when to return an indication to the website. The indication indicates a suspected attempt to establish a fraudulent account. The processing includes comparing the data from the user to reference data indicating an attempt to fraudulently establish the website account. Additionally, the exemplary embodiment includes returning the indication to the website based on the processing of the query.

In an exemplary embodiment, a device for Internet security includes a processor configured to receive a query from a website. The query includes data associated with a user establishing an account with the website. The processor is further configured to include processing the query to determine when to return an indication to the website, the indication indicating a suspected attempt to establish a fraudulent account. Additionally, the processing includes comparing the data from the user to reference data indicating an attempt to fraudulently establish the website account. Finally, the processor is configured to return the indication to the website based on the processing of the query.

In an exemplary embodiment, a method of Internet security includes monitoring determinations being made related to a first indication to the website, the first indication indicating a suspected attempt to establish a fraudulent account. The exemplary embodiment further includes reviewing data related to the fraudulent account to determine patterns. The exemplary embodiment also includes returning a second indication to the website based on the reviewing of the data.

BRIEF DESCRIPTION OF THE DRAWING FIGURES

Additional aspects of the present invention will become evident upon reviewing the non-limiting embodiments described in the specification and the claims taken in conjunction with the accompanying figures, wherein like numerals designate like elements, and:

FIG. 2 is a flow chart for an example method disclosed herein; and

FIG. 3 is a flow chart for an example method disclosed herein.

DETAILED DESCRIPTION

Figure 1:
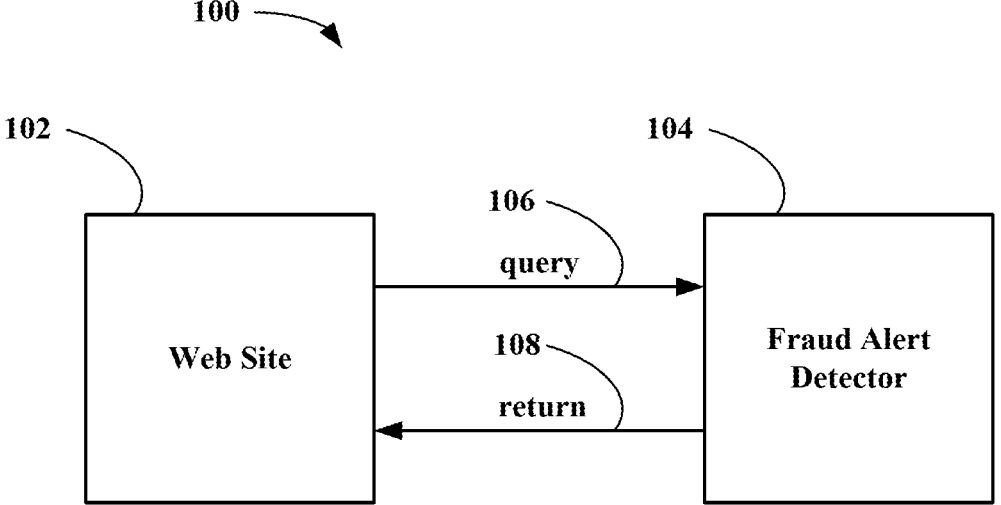
FIG. 1 is a block diagram illustrating an example of a system for Internet security.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

FIG. 1 is a block diagram illustrating an example of a system for Internet security 100. The block diagram includes a website 102, and a fraud alert detector 104. Generally, the fraud alert detector 104 will be described herein using examples of fraud detection. For example, the systems and methods described herein may use various indicators to determine that an account on a website has been set up with fraudulent intent (or is suspected of being set up with fraudulent intent). An account that is not judged to be potentially fraudulent may generally be assumed to be a valid account at least until such time that the use or activities performed using the account indicate a fraudulent account or a hacked account of a non-fraudulent user. The systems and methods described herein may generally be used to determine accounts set up with fraudulent intent. However, in accounts with a longer-term history, these same activities may indicate a hacked account. A hacked account may be an account of a legitimate user that has been accessed by other users with the intent to conduct fraudulent activities, either against the account holder or against others. Accordingly, the systems and methods described herein may also be applied to determining hacked accounts, in some examples.

Additionally, in an exemplary embodiment, the systems and methods described herein may be applied to not just detecting fraud, but to the detecting of valid or "trusted" accounts set up by sincere new account holders. Thus, in some exemplary embodiments, various indicators to determine sincerity may be used. For example, indictors of sincerity of a user may include not performing any of the acts described as indicators of fraud. Accounts that are not used to perform indicators of fraud may be valid or trusted accounts. However, to flag an account not just as non-fraudulent, but as trusted may require more than an account that is not used to perform acts that constitute fraud indicators. Accordingly, in some circumstances, an account may be judged to be valid rather than just assumed to be valid based on acts deemed to indicate non-fraudulent intent by the account holder. For example, multiple successful credit card purchases over time may be an indicator that an account may be trusted. In another example, use of an account in a non-fraudulent way over time may be an indicator that the account may be trusted. Ultimately, however, the judgment that an account is valid or trusted may still be an assumption. However, in some cases, the assumption may have a high probability of being correct.

The fraud alert detector 104 may be a device for Internet security. For example, the fraud alert detector 104 may include a processor or other circuitry to detect fraud (or sincerity). In an exemplary embodiment, the processor may be configured to receive a query from the website 102. The query may be a query from the website 102 with respect to a new user account being created on the website 102. The query may include data associated with a user establishing an account with the website. The fraud alert detector 104 may use the data received from the website 102 to predict if a new account is fraudulent, non-fraudulent, or may be trusted. Furthermore, the systems and methods described herein may receive such data relating to an account existing from some period of time and make determinations or predictions regarding whether the account has been hacked.

For example, the data may include one or more of a user-provided email address related to establishing the account, a user-provided password for establishing the account, a text message sent using the account, a country of origin for the user establishing the account, an IP address of the user establishing the account, an indication of the user (a user has been blocked by a predetermined number of other users, a user has multiple accounts, or other user based indications), a failed credit card transaction associated with the account, a text message sent using the account, or data of a type compatible for comparison to the reference data. As used herein, text messages may include messages sent via a website messaging system. The messages sent via the web site, i.e., "text messages," may generally include text. However, the messages are not limited to only messages including text. For example, the messages sent via the web site may include text, emojis, or other information that may be sent by a web site-based messaging system. Generally, sending a text message alone may not be an indicator of fraudulent intent, however, various content of the text message may indicate fraudulent intent. For example, some people that commit fraud may do so over the Internet from great distances. The language of the fraud targets may not be the fraudulent person's primary language. Accordingly, the use of language may sound or look strange, e.g., to native or fluent speakers. An example text message with odd language may recite, e.g., "hail, I am honest." "Hail, I am honest" may not be from a person who is indeed honest. Rather, the strange use of language and the claim to being honest in an initial contact may both indicate a lack of sincerity on the part of the person sending the message.

In an exemplary embodiment where the data associated with the user includes a user-provided email address related to establishing the account, the reference data indicating the attempt to fraudulently establish the website account may include an indication that the user-provided email has been used to open other accounts. For example, other accounts on the same website may have been opened using the same or nearly the same email address, e.g., johnsmith@gmail.com, john.smith@gmail.com, jo.hnsmi.th@gmail.com, or other similar email addresses. Generally, the number of other accounts may be some number greater than 1-3 accounts. For example, a user may attempt to open a large number of accounts to use for fraudulent activities such as spamming, phishing, or other fraudulent activities. Furthermore, in some examples, the number of accounts being opened may be opened in a short period of time. For example, a user attempting to use accounts fraudulently may attempt to open multiple accounts on the same day or over a small number of days. In one example, a user may attempt to open more than 5 accounts in less than 24 hours. However, the number of accounts and the timing of opening of such accounts that may be considered to indicate fraud may vary depending on the specific website, type of website, or other factors. Accordingly, a person of skill in the art may determine other numbers of websites and/or other ranges of time based on reviewing accounts on specific websites, types of websites, or other factors. Furthermore, these numbers may be determined using machine learning. For example, a device may process a number of known fraudulent websites and determine that the fraudulent website accounts are all from users having 10 or more different website accounts, as an example. Generally, an indication of a fraudulent user may lead to a flag or warning returned to the website. In some instances, an indication of a fraudulent user may lead to a suggestion to eliminate the corresponding account from the website. The action taken may vary depending on the circumstances of the particular indicator. For example, five or more different website accounts may lead to a flag or warning, while 50 different website accounts may lead to account termination.

In another exemplary embodiment, a distance selected for a search may be an indicator of fraudulent activity or intent to commit fraudulent activity. For example, a user may generate an account on a website 102. The user may search for other users (e.g., using user profiles, ads by users, or other user information depending on the type of website). The search may be performed over a predetermined distance. For example, a user intending to use the website 102 for fraudulent purposes may search for the largest possible search area on the website in an attempt to find the largest number of other users of the website. Accordingly, selecting the largest distance for a search, particularly the largest possible distance, may be an indicator that the user may have an intent to use the account on the website 102 for fraudulent purposes.

However, a large search area might also indicate that a user is looking for a difficult to find item, e.g., on a sales website. Accordingly, the user may simply be trying to find the difficult to find item and not be able to locate the item closer to the user's location. Thus, the user may try the largest allowable search area to find the difficult to find item.

Accordingly, it may be useful to review multiple indicators to try to determine an accountholder's intent.

In the exemplary embodiment where the data associated with the user includes a user-provided password for establishing the account and the reference data indicating the attempt to fraudulently establish the website account includes an indication that the same password has been used to open other accounts. For example, fraudulent users may use multiple accounts and may not want to remember multiple passwords. Accordingly, a fraudulent user may use the same password multiple times on multiple fraudulent accounts. In some instances, the same password may be used so that multiple fraudulent users may have easy access to the one or more fraudulent accounts. Generally, an indication of a fraudulent user may lead to a flag or warning returned to the website. In some instances, an indication of a fraudulent user may lead to a suggestion to eliminate the corresponding account from the website. In an example, the use of the same password for multiple accounts may generally result in the accounts being flagged.

It will be understood, however, that some sincere users, particularly sincere but unsophisticated users may reuse passwords because they are not aware the dangers of such practices or, like some fraudulent users, they have trouble remembering multiple passwords. Accordingly, in some cases, it may be advantageous to review or use multiple factors when making a determination of fraudulent activity or fraudulent intent.

Furthermore, in some exemplary embodiments, some indicators may result in flagging for further review of an account, e.g., by a human reviewer. Some factors may result in a recommendation for termination of an account. Generally, a recommendation for termination of an account may also require further review by a human prior to account termination. However, in some embodiments, for factors or groups of factors that may be strong enough indicators of fraudulent activity, account termination may be automatic. In an exemplary embodiment, however, any account changes may be performed at the website rather than at the fraud alert detector 104, even when such account changes are automatic. For example, the fraud alert detector 104 may detect potential fraud and suggest account termination to the website. In some cases, the website may terminate the account automatically. In other cases, human intervention may be needed.

In an exemplary embodiment, the data associated with the user includes a text message sent using the account. The reference data indicating the attempt to fraudulently establish the web site account may include a text message including text from a list. For example, a list of suspect words or phrases may be kept or developed that include words or phrases commonly used by scammers. For example, scammers may tend to claim to be honest and/or trustworthy in communications. The systems and methods described herein may look for such claims of honesty or trustworthiness or other phrases that may be considered to provide an indication of a lack of trustworthiness. Additionally, scammers may tend to misspell words. Some of these misspellings may be common enough misspellings to include in the list of suspect words or phrases. Generally, an indication of a fraudulent user based on a misspelling may lead to a flag or warning returned to the website. In some instances, however, words may be so commonly used by scammers and so uncommonly used in typical conversation that an indication of a fraudulent user may lead to a suggestion to eliminate the corresponding account from the website.

In another exemplary embodiment, the data associated with the user includes a text message sent using the account and the reference data is the text message requesting that a message be sent to an email address different from the user-provided email address related to establishing the account. For example, a user may establish an account with a website by providing a first email address, such as firstemailaddress@fraud.com while sending messages asking other users to email him or her at secondemail@honestandtrustworthy.com. Using a different email address in a message from the email address that is used to create the account may be suspicious behavior and may be an indicator of fraudulent activity. As described above, generally, an indication of a fraudulent user may lead to a flag or warning returned to the website. In some instances, an indication of a fraudulent user may lead to a suggestion to eliminate the corresponding account from the website.

In an exemplary embodiment, the data associated with the user includes a country of origin for the user establishing the account and the reference data indicating the attempt to fraudulently establish the website account includes the country of origin not being on an approved country list. In some examples, the approved country list may be a single country. In other examples, the approved country list may include more than one country. Generally, a country not being on the approved country list may lead to a flag or warning.

In another exemplary embodiment, the data associated with the user includes a country of origin for the user establishing the account and the reference data indicating the attempt to fraudulently establish the website account includes the country of origin being on a disapproved country list. Generally, an indication of a fraudulent user may lead to a flag or warning returned to the website. In some instances, an indication of a fraudulent user may lead to a suggestion to eliminate the corresponding account from the website. For example, some disapproved countries may have an extremely high rate of fraud, e.g., near 100%; accordingly, a recommendation to eliminate the corresponding account may be warranted.

In an exemplary embodiment, the data associated with the user includes an IP address of the user establishing the account. The reference data indicating an attempt to fraudulently establish the website account includes at least one of the IP address not being on an approved IP address list, the IP address being on an unapproved IP address list, and the IP address being on a high-risk IP address list. As discussed above, generally, an indication of a fraudulent user may lead to a flag or warning returned to the website. In some instances, an indication of a fraudulent user may lead to a suggestion to eliminate the corresponding account from the website. The IP address not being on an approved IP address list may generally lead to a flag or warning. The IP address being on an unapproved IP address list may also lead to a flag or warning. The IP address being on a high-risk IP address list may lead to eliminating the corresponding account or a suggestion to eliminate the corresponding account. However, it will be understood that the specifics on which instances lead to warnings and which instances lead to flags may vary from implementation to implementation and indicator to indicator.

In an exemplary embodiment, the data associated with the user includes an indication of the user. An indication of a user is an indication that may be tied to that user's actions. For example, the indication of the user may be that the user has been blocked by a predetermined number of other users, e.g., one other user, two other users, five other users, or some other number of other users. Blocking a user may generally occur based on another user disliking that user's actions and thus, blocking that user. Another example is an indication that the user has multiple accounts, e.g., two accounts, three accounts, five accounts, ten accounts, or some other number of accounts. Thus, the user action of opening multiple accounts may be an indicator of fraudulent or planned fraudulent activities.

In an exemplary embodiment, the data associated with the user includes a failed credit card transaction associated with the account and the reference data indicating the attempt to fraudulently establish the website account includes existence of a predetermined number of other failed credit card transactions associated with the account over a predetermined period of time. For example, two, three, five, or some other number of failed credit card transactions may be used as an indication of fraud. The failed credit card attempts may be over minutes, hours, or days, depending on the particular implementation.

In an exemplary embodiment, the data associated with the user includes a text message sent using the account. The reference data indicating the attempt to fraudulently establish the website account includes a predetermined number of other text messages sent using the account. In an example, the text message and the predetermined number of other text messages may be sent within a predetermined period of time. For example, a user that sends a large number of messages, e.g., greater than 25 or some other predetermined number, may be a fraudulent user.

In an exemplary embodiment, the data associated with the user includes data of a type compatible for comparison to the reference data. For example, the type of data may be based on an indicator generated using machine learning. In an example, a device may review data sets and determine factors that indicate fraud within those data sets. For example, known fraudulent data sets may be processed to find patterns in the data indicating fraud. Accordingly, an indicator may be generated by machine learning. The indicator may be generated by machine learning based on machine analysis of fraudulent accounts to determine indicators of the fraudulent accounts. The indicators may be compared to the data associated with the user.

In an exemplary embodiment, the reference data indicating the attempt to fraudulently establish the website account includes reference data generated for another website. For example, fraud alert detector 104 may be in communication with multiple websites 102. Accordingly, data from the multiple websites 102 may be used to make fraud determinations for one or more of the websites 102. Thus, fraudulent accounts may, in some cases, be determined earlier on some websites because fraudulent users may be determined based on data from the other websites 102. Accordingly, a machine learning models may be generated for fraudulent accounts or non-fraudulent accounts. Some embodiments may use neural networks, which are a type of machine learning tool. In some examples, fraud may be perpetrated by a same person or group of people across or between multiple websites.

As discussed above, circuitry, such as a processor, in the fraud alert detector 104 may receive a query from a website. The query may include data associated with a user establishing an account with the website. Accordingly, the circuitry may process the query to determine when to return an indication to the web site. The indication may indicate a suspected attempt to establish a fraudulent account. The processing may include comparing the data from the user to reference data indicating an attempt to fraudulently establish the website account. The processor may also return the indication to the website based on the processing of the query.

For example, processing the query may include, as discussed above, determining one or more failed credit card transactions associated with the account, comparing for reuse of passwords, comparing to a list of suspect words or phrases, looking for the use of a different email address in messages from the email address that is used to create the account, comparing a country of origin to an approved country list or a disapproved country list, comparing to determine an IP address not being on an approved IP address list, the IP address being on an unapproved IP address list, or the IP address being on a high-risk IP address list, or comparing to determine a user has been blocked, or has too many accounts.

The systems and methods described above may generally review data from new user accounts to find accounts suspected of being fraudulent accounts. Suspected fraudulent accounts may be flagged and/or recommended for deletion depending on the particular indicator or indicators found when processing the accounts. For example, as discussed above, accounts from some countries may be nearly 100% fraudulent and may warrant an immediate recommendation that the account is terminated by the website. Multiple example indicators are discussed herein. However, the indicators may not always indicate a potential for fraud. For example, as discussed above, the use of the same password across multiple accounts may be an indication that the accounts are being set up for fraudulent purposes. However, using the same password may also indicate a weak password, e.g., "password," "ABCDEFG," "ABC123," or other commonly used weak passwords. Accordingly, it may be necessary to generate flags or warnings so that a human being may review the account information for the flagged account to try to determine if the account is believed to be fraudulent.

In an exemplary embodiment, the systems and methods described herein may review multiple indicators to determine if an account is believed to be fraudulent. For example, passwords may be compared to each other and compared to a list of common or overused passwords. Use of a password that is on the common or overused password list may indicate an inexperienced or lazy user, rather than a user with fraudulent intent. Accordingly, a flag for fraud or an indication to close an account may not be necessary. In an example, however, an indication to pick a different password may be advised. For example, the fraud alert detector 104 may transmit a recommendation that a user selects a different password to the website 102. The website 102 may or may not implement such functionality. For example, a user of the website may be required to change the user's password before the user can access the user's account.

In an example, a number of points or other weights may be assigned to the different indicators discussed. Accordingly, some indicators alone may cause an account to be flagged or suggested for deletion. Other indicators may not be weighted heavy enough to cause an account to be flagged or suggested for deletion. Thus, multiple indicators may be needed to cause an account to be flagged or suggested for deletion. Furthermore, the weight of a given indicator may not be fixed. For example, one indicator discussed above is the number of messages sent over a period of time using a new account. In an example, different weights or point values may be assigned based on the actual number of messages sent over a threshold within a time period. In an example, a rate may be used, such as a number of messages per hour. A threshold based on the rates may be selected. Weights may be assigned using numbers of messages over the threshold. In an example, the weights may be based on ranges of numbers of messages over a time period.

In an exemplary embodiment of the fraud alert detector 104, an account may be flagged as one of a possible fraudulent account, or a non-fraudulent or trusted account based on rules, such as one or more of the rules described herein. For example, rules may include, but are not limited to a country of origin for the user establishing the account, an IP address of the user establishing the account, an indication of the user (e.g., such as a user having been blocked by a predetermined number of other users, a user having multiple accounts, or other user based indications), a failed credit card transaction associated with the account, a text message sent using the account, or data of a type compatible for comparison to the reference data, or other rules.

In an exemplary embodiment of the fraud alert detector 104, an account may be flagged as one of a possible fraudulent account, or a non-fraudulent or trusted account based on rules that are hard coded rules, e.g., hard coded into processing hardware implementing the systems and methods described herein. For example, the rules discussed above may be hard coded rules. In an example embodiment, countries of origin for the user establishing the account may indicate a fraudulent account or may indicate a non-fraudulent or trusted account. These rules may be hard coded. In other words, a list of countries indicating a possible fraudulent account may be hard coded. Similarly, a list of countries indicating a non-fraudulent or trusted account may be hard coded.

In an exemplary embodiment of the fraud alert detector 104, an IP address of the user establishing the account that indicates a fraudulent account, or a non-fraudulent or trusted account may be hard coded. In other words, a list of IP addresses indicating a possible fraudulent account may be part of the hard-coded rules. Similarly, a list of IP addresses indicating a non-fraudulent or trusted account may also be part of the hard-coded rules.

In an exemplary embodiment of the fraud alert detector 104, an indication of the user (such as a user having been blocked by a predetermined number of other users, a user having multiple accounts, or other user-based indications) that indicates a fraudulent account or a non-fraudulent or trusted account may be hard coded. A failed credit card transaction associated with the account that indicates a fraudulent account. Generally, a failed credit card might not be used to indicate a non-fraudulent or trusted account. Such rules may be hard coded. A text message sent using the account, or data of a type compatible for comparison to the reference data, or other rules that indicate a fraudulent account, or indicate a non-fraudulent or trusted account may be hard coded.

The rules that include a country of origin for the user establishing the account, an IP address of the user establishing the account, an indication of the user (e.g., such as a user having been blocked by a predetermined number of other users, a user having multiple accounts, or other user based indications), a failed credit card transaction associated with the account, a text message sent using the account, or data of a type compatible for comparison to the reference data, or other rules may be non-hard coded rules, as discussed above.

However, in some embodiments, the rules may be end-user programmed, e.g., using a "rule builder." The rule builder may allow end users to generate rules. Accordingly, in some example embodiments, rules may be generated and/or changed by an end user. In such an embodiment, some rules may be hard coded. Some rules may be included at the time a device is manufactured. These rules may be considered default rules. The default rules may be changeable or erasable by a user or users of the device, e.g., when the device is in use. Other rules may be added in the place of the default rules. The rule builder may be a user accessible interface that allows for the user to generate rules that may be applied to the systems and methods described herein. The user may generate completely new rules or modify existing rules. For example, in some embodiments, a user may add to a list of suspect countries, remove countries from a list of suspect countries, add entirely new rules, change threshold settings for existing rules, or otherwise make changes or additions to rules.

In another embodiment, rules relating to a list of IP addresses indicating a possible fraudulent account may be part of the non-hard coded rules. Similarly, a list of IP addresses indicating a non-fraudulent or trusted account may also be part of the non-hard coded rules.

In an exemplary embodiment of the fraud alert detector 104, an indication of the user (such as a user having been blocked by a predetermined number of other users, a user having multiple accounts, or other user-based indications) that indicates a fraudulent account, or a non-fraudulent or trusted account may be non-hard coded. A failed credit card transaction associated with the account that indicates a fraudulent account. Generally, a failed credit card might not be used to indicate a non-fraudulent or trusted account. Such rules may be non-hard coded. A text message sent using the account, or data of a type compatible for comparison to the reference data, or other rules that indicate a fraudulent account, or indicate a non-fraudulent or trusted account may be non-hard coded.

In an example embodiment of the fraud alert detector 104, the rule builder may allow an end user to input or otherwise generate a rule or rules, save the rule or rules to the system, and implement the rules. When the rules are implemented, the rules may change or modify what action or actions are flagged. For example, when a user uses the rule builder to change a threshold, e.g., increase a number of denied credit card charges required to flag an account, the flagging criteria is different.

Example embodiments of the fraud alert detector 104 may make decisions based on geographic location such as a country, continent, state, province, or other geographic location of a device accessing an example website. The impact of different geographic locations may be changed using the rule builder, such as by adding or deleting suspect countries. Accordingly, the actions of the systems and methods described herein may be modified with changing geographic norms related to the generation of fraudulent website accounts.

In an exemplary embodiment of the fraud alert detector 104, machine learning may be used. Machine learning may be the study of computer algorithms that improve automatically through experience. In an example embodiment, the fraud alert detector 104 may monitor determinations being made related to when to return an indication to the website, the indication indicating a suspected attempt to establish a fraudulent account, the processing including comparing the data from the user to reference data indicating an attempt to fraudulently establish the website account (or to establish a non-fraudulent account).

When an attempt to fraudulently establish the website account (or to establish a non-fraudulent account) is revealed, data related to the fraudulent account or to the non-fraudulent account may be reviewed to determine patterns used when establishing fraudulent (or non-fraudulent) accounts.

Establishing a model of a user that may provide an indicator of accounts which may indicate fraudulent accounts or non-fraudulent accounts. In an example, the model may include one or more behaviors used by honest or dishonest account holders.

In an example embodiment, the model may be applied to other users account data, e.g., users as of yet unidentified. The application of the model to user data may indicate other cases of fraudulent accounts.

In an exemplary embodiment of the fraud alert detector 104, an account may be flagged as one of a possible fraudulent account, or a non-fraudulent or trusted account based on making a determination of same or similar images being used by a person, people, or a computing device attempting to establish an account. Such an account or accounts may be blocked. Additionally, a device implementing the systems and methods described herein may review other accounts to determine if a same picture is used. Determinations with respect to pictures may be made using a hash of the picture or pictures. Pictures having the same hash may be blocked. Alternatively, a non-fraudulent or trusted account may be determined based on a picture or pictures.

In an exemplary embodiment of the fraud alert detector 104, an account may be flagged as one of a possible fraudulent account, or a non-fraudulent or trusted account based on IP addresses. For example, IP addresses shown in the past to be used for establishing valid website accounts may have a higher probability of establishing valid website accounts in the future. Conversely, IP addresses shown in the past to be used for establishing invalid or fraudulent website accounts may have a higher probability of establishing invalid or fraudulent website accounts in the future. This may be particularly true for IP addresses hosting a smaller number of users. IP addresses generally hosting a large number of users, e.g., such as a mobile carrier for mobile electronic devices may generally not provide an indication of valid or invalid website accounts in the future, because a wide range of diverse users may use the same mobile carrier. For example, in such a case, IP addresses may be the same for multiple people using the same mobile carrier or other service provider and these people may have little or almost nothing in common except for the use of the same carrier. For example, people using the same mobile carrier may not be involved in generating invalid or fraudulent web site accounts. Accordingly, while some IP addresses may be tracked to determine groups of people using the same location for illicit activity such as generating invalid website accounts, in other cases, groups of people may be using a same mobile carrier. Large groups of people using the same mobile carrier are not particularly likely to be a group of people conducting nefarious activities. For example, a group that is hacking one or more websites may use the same mobile carrier, but it is much less likely that the illicit group will be the only people using the same carrier. Accordingly, it may be unwise to block an entire IP address for a mobile carrier or other service provider. For some cases, however, such as where everyone (or some percentage) in a group uses the same IP address and everyone using the IP address is involved in attempts to hack websites, the IP address may be blocked. For example, in an exemplary embodiment of the fraud alert detector 104, may "blacklists" (or "white list") various IP addresses or domains.

In an example embodiment, lists of mobile carriers and the corresponding IP addresses may be generated such that those IP addresses will not be blacklisted when a user of the mobile carrier is flagged. Rather, for such mobile carriers (or other similar carriers), one or more of the other aspects of the systems and methods described herein may be applied. For example, one or more of a user-provided email address related to establishing the account, a user-provided password for establishing the account, a text message sent using the account, a country of origin for the user establishing the account, an IP address of the user establishing the account, an indication of the user (a user has been blocked by a predetermined number of other users, a user has multiple accounts, or other user based indications), a failed credit card transaction associated with the account, a text message sent using the account, or data of a type compatible for comparison to the reference data may all be used as indicators of potential fraudulent use, e.g., when fraudulent accounts have been generated in the past. Additionally, other aspects of the systems and methods described herein may also be applied.

In an exemplary embodiment of the fraud alert detector 104, browser fingerprinting may be used. Browser fingerprinting may use various attributes of a browser to track a particular user or group of users. Browser finger printing may include tracking browser settings, resolutions, fonts, plugins, monitors used, monitor settings, and other computer settings to track a user or users. For example, groups of people may use the same computing devices. Accordingly, if one person on a same computing device is flagged as one of a possible fraudulent account, or a non-fraudulent or trusted account, other people using the same computing device, e.g., as determined by browser fingerprinting may be suspect. However, this may only be an indicator. For example, a computing lab may have multiple people using the same computing devices who are not related to each other and not involved in the same activities.

In an example embodiment, one or more of the aspects described herein that may indicate fraud (or may indicate a valid account) may be combined in a scoring of each factor used in a particular embodiment. For example, different factors may be given a numerical weight as described above. The numerical weight may allow the factors to be combined based on rank, importance, or status with respect to how strong a particular indicator may be. For example, where an IP address for a mobile carrier is used, that numerical weight may have a low or zero score in the combination. Where an IP address used is not for a mobile carrier, the numerical weight may have a higher score for use in generating the combination.

FIG. 2 is a flow chart for an example method 200 disclosed herein. The method 200 is a method of Internet security. The method 200 includes receiving a query from a web site (202). The method 200 also includes processing the query to determine when to return an indication to the website (204). Additionally, the method 200 includes returning the indication to the website based on the processing of the query (206).

Receiving a query from a web site (202) may include receiving a query that includes data associated with a user establishing an account with the website. For example, as discussed above, the data may include data associated with a user establishing an account with the website. The data may be used to predict if a new account is fraudulent, non-fraudulent, or may be trusted. The data may include one or more of a user-provided email address, a user-provided password, a text message sent using the account, a country of origin for the user establishing the account, an IP address of the user establishing the account, an indication of the user (a user has been blocked by a predetermined number of other users, a user has multiple accounts, or other user based indications), a failed credit card transaction associated with the account, a text message sent using the account, or data of a type compatible for comparison to the reference data.

Processing the query to determine when to return an indication to the website (204) may include returning an indication that indicates a suspected attempt to establish a fraudulent account. The processing may include comparing the data from the user to reference data indicating an attempt to fraudulently establish the website account.

Additionally, the method 200 includes returning the indication to the website based on the processing of the query (206). The indication may be used by the website to predict if an account is fraudulent. In some example embodiments, an indication of a fraudulent user may lead to a flag or warning returned to the website. In some instances, an indication of a fraudulent user may lead to a suggestion to eliminate the corresponding account from the web site.

FIG. 3 is a flow chart for an example method 300 disclosed herein. The method 300 is a method of Internet security. The method 300 includes monitoring determinations being made related to a first indication to the website, the first indication indicating a suspected attempt to establish a fraudulent account (302). The method 300 also includes reviewing data related to the fraudulent account to determine patterns (304). Additionally, the method 300 includes returning a second indication to the website based on the reviewing of the data (306).

The method 300 of FIG. 3 may implement a system that may use machine learning to better determine fraudulent generation of web site accounts. For example, step 302 relates to initially finding fraudulent activity. When fraudulent activity is found, machine learning may be used to use the information gained to potentially find other fraudulent activity. For example, step 304 applies what is learned to review data from other accounts. The results of that effort are returned in step 306, i.e., the potential fraudulent activity.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be appreciated that the particular implementations shown and described herein are illustrative of the invention and its best mode and are not intended to otherwise limit the scope of the present invention in any way. Furthermore, the connecting lines shown in the various figures contained herein are intended to represent exemplary functional relationships and/or physical couplings between the various elements. It should be noted that many alternative or additional functional relationships or physical connections may be present in a practical device.

As one skilled in the art will appreciate, the mechanism of the present invention may be suitably configured in any of several ways. It should be understood that the mechanism described herein with reference to the figures is but one exemplary embodiment of the invention and is not intended to limit the scope of the invention as described above.

It should be understood, however, that the detailed description and specific examples, while indicating exemplary embodiments of the present invention, are given for purposes of illustration only and not of limitation. Many changes and modifications within the scope of the instant invention may be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example, the operations recited in any method claims may be executed in any order and are not limited to the order presented in the claims. Moreover, no element is essential to the practice of the invention unless specifically described herein as "critical" or "essential."

What is claimed:

1. A method of providing Internet security implemented via execution of computing instructions configured to run at one or more processors and configured to be stored at non-transitory computer-readable media, the method comprising:

receiving, at the one or more processors, historical data on fraudulent accounts, including previously submitted, user-provided email addresses used to open other accounts, from a plurality of websites, wherein the plurality of websites includes at least two non-affiliated websites operated by different entities;

determining, at the one or more processors and using a machine learning model, indicators of fraudulent accounts within the historical data on the fraudulent accounts, wherein the indicators of fraudulent accounts comprise, for each user-provided email address, an account creation rate for fraudulent users computed over a defined time window across the plurality of websites and an image hash of a fraudulent user, and the machine learning model processes the historical data on fraudulent accounts from the plurality of websites to determine the account creation rate for fraudulent users after normalizing email addresses by alias conflation and punctuation removal;

receiving, at the one or more processors, a query from a website, the query including:

data associated with a user establishing an account with the website, the data associated with the user comprises a user-provided email address related to establishing the account; and an image associated with the account;

processing, using the one or more processors, fraudulent account data received from another website different than the website to generate the historical data in a format compatible with the machine learning model, including normalizing user-provided email addresses by removing punctuation and aliasing variations;

comparing, using the one or more processors and the machine learning model, the data associated with the user to the indicators of fraudulent accounts to determine when the account is likely to be fraudulent, wherein the comparing includes comparing an account creation rate associated with the normalized user-provided email address to the account creation rate for fraudulent users computed across the plurality of websites within the defined time window and comparing the image associated with the account with the image hash of the fraudulent user; and when the account is likely to be fraudulent, transmitting, using the one or more processors, an indication to the website, the indication indicating a suspected attempt to establish a fraudulent account.

2. The method of claim 1, wherein the data associated with the user further comprises a user provided password for establishing the account and the historical data further comprises previously submitted passwords used to open other accounts.

3. The method of claim 1, wherein the data associated with the user further comprises a text message sent using the account and the historical data further comprises text requesting that a message be sent to an email address different from a user provided email address related to establishing the account.

4. The method of claim 1, wherein the data associated with the user further comprises a number of text messages sent using the account and the historical data further comprises a predetermined number of text messages sent using the account within a predetermined period of time.

5. The method of claim 1, wherein the defined time window is twenty-four hours and the account creation rate for fraudulent users is computed as a count of distinct accounts created using the normalized email address across the plurality of websites within the twenty-four-hour window.

6. The method of claim 1, wherein the normalizing user-provided email addresses comprises at least one of removing punctuation, removing aliasing characters, or lower-casing the local-part and domain.

7. The method of claim 1, wherein the plurality of websites includes at least two non-affiliated websites operated by different entities.

8. The method of claim 1, wherein transmitting the indication to the website causes the website to perform at least one of: flagging the account for human analyst review, temporarily suspending the account, or blocking further account creation attempts from the normalized email address.

9. The method of claim 1, wherein:

the indicators of fraudulent accounts further comprise a browser fingerprint of a fraudulent user; and the comparing the data associated with the user to the indicators of fraudulent accounts to determine when the account is likely to be fraudulent, includes comparing a browser fingerprint associated with the account to the browser fingerprint of the fraudulent user.

10. The method of claim 1, wherein:

the processing fraudulent account data received from another website different than the website to generate the historical data in a format compatible with the machine learning model further includes generating an image hash from a received image;

the comparing the image associated with the account with the image hash of the fraudulent user includes comparing the image hash from the received image with the image hash of the fraudulent user; and the machine learning model processes the historical data on fraudulent accounts from the plurality of websites to determine the account creation rate for fraudulent users after generating the image hash from the received image.

11. The method of claim 1, wherein the comparing the data associated with the user to the historical data comprises:

inputting the data associated with the user into a user based model created using the historical data; and determining when the data associated with the user is similar to the historical data using the user based model.

12. The method of claim 1, further comprising:

in response to determining the account is likely to be fraudulent, receiving instructions to delete the account.

13. The method of claim 1, wherein the transmitting the indication comprises:

transmitting the indication to the website using the machine learning model, the indication indicating the suspected attempt to establish the fraudulent account.

14. The method of claim 1, wherein the machine learning model comprises a neural network.

15. A device for Internet security, the device comprising one or more processors configured to:

receive historical data on fraudulent accounts, including previously submitted, user-provided email addresses used to open other accounts, from a plurality of websites, wherein the plurality of websites includes at least two non-affiliated websites operated by different entities;

determine, using a machine learning model, indicators of fraudulent accounts within the historical data on the fraudulent accounts, wherein the indicators of fraudulent accounts comprise, for each user-provided email address, an account creation rate for fraudulent users computed over a defined time window across the plurality of websites and an image hash of a fraudulent user, and the machine learning model processes the historical data on fraudulent accounts from the plurality of websites to determine the account creation rate for fraudulent users after normalizing email addresses by alias conflation and punctuation removal;

receive a query from a website, the query including:

data associated with a user establishing an account with the website, the data associated with the user comprises a user-provided email address related to establishing the account; and an image associated with the account;

processing, using the one or more processors, fraudulent account data received from another website different than the website to generate the historical data in a format compatible with the machine learning model, including normalizing user-provided email addresses by removing punctuation and aliasing variations;

compare, using the machine learning model, the data associated with the user to the indicators of fraudulent accounts to determine when the account is likely to be fraudulent, wherein the comparing includes comparing an account creation rate associated with the normalized user-provided email address to the account creation rate for fraudulent users computed across the plurality of websites within the defined time window and comparing the image associated with the account with the image hash of the fraudulent user; and when the account is likely to be fraudulent, transmitting an indication to the website, the indication indicating a suspected attempt to establish a fraudulent account.

16. The device of claim 15, wherein the data associated with the user further comprises a user provided password for establishing the account and the historical data further comprises previously submitted passwords used to open other accounts.

17. The device of claim 15, wherein the data associated with the user further comprises a text message sent using the account and the historical data further comprises text requesting that a message be sent to an email address different from a user provided email address related to establishing the account.

18. The device of claim 15, wherein the data associated with the user comprises a number of text messages sent using the account and the historical data comprises a predetermined number of text messages sent using the account within a predetermined period of time.

19. A system comprising:

one or more processors; and one or more non-transitory computer-readable storage devices storing computing instructions configured to run on the one or more processors and cause the one or more processors to perform:

receiving historical data on fraudulent accounts, including previously submitted, user-provided email addresses used to open other accounts, from a plurality of websites, wherein the plurality of websites includes at least two non-affiliated websites operated by different entities;

determining, using a machine learning model, indicators of fraudulent accounts within the historical data on the fraudulent accounts, wherein the indicators of fraud fraudulent accounts comprise, for each user-provided email address, an account creation rate for fraudulent users computed over a defined time window across the plurality of websites and an image hash of a fraudulent user, and the machine learning model processes the historical data on fraudulent accounts from the plurality of websites to determine the account creation rate for fraudulent users after normalizing email addresses by alias conflation and punctuation removal;

receiving a query from a website, the query including:

data associated with a user establishing an account with the website, the data associated with the user comprises a user-provided email address related to establishing the account; and an image associated with the account;

processing fraudulent account data received from another website different than the website to generate the historical data in a format compatible with the machine learning model, including normalizing user-provided email addresses by removing punctuation and aliasing variations;

comparing, using the machine learning model, the data associated with the user to the indicators of fraudulent accounts to determine when the account is likely to be fraudulent, wherein the comparing includes comparing an account creation rate associated with the normalized user-provided email address to the account creation rate for fraudulent users computed across the plurality of websites within the defined time window and comparing the image associated with the account with the image hash of the fraudulent user; and when the account is likely to be fraudulent, transmitting an indication to the website, the indication indicating a suspected attempt to establish a fraudulent account.

20. The system of claim 19, wherein the comparing the data associated with the user to the historical data comprises:

inputting the data associated with the user into a user based model created using the historical data; and determining when the data associated with the user is similar to the historical data using the user based model.

21. The device of claim 15, wherein the comparing the data associated with the user to the historical data comprises:

inputting the data associated with the user into a user based model created using the historical data; and determining when the data associated with the user is similar to the historical data using the user based model.

22. The device of claim 15, the processor is further configured to receive instructions to delete the account.

23. The system of claim 19, wherein the transmitting the indication comprises:

transmitting the indication to the website using the machine learning model, the indication indicating the suspected attempt to establish the fraudulent account.

24. The system of claim 19, wherein the machine learning model comprises a neural network.

25. The system of claim 20, wherein the determining when the data associated with the user is similar to the historical data comprises determining whether the data associated with the user comprises behaviors of non-fraudulent accounts.

26. The method of claim 11, wherein the determining when the data associated with the user is similar to the historical data comprises determining whether the data associated with the user comprises behaviors of non-fraudulent accounts.

\* \* \* \* \*